United States Patent
Lin et al.

(10) Patent No.: US 9,644,423 B2
(45) Date of Patent: May 9, 2017

(54) ROLL CONTROL DEVICE OF A VEHICLE CURTAIN

(71) Applicant: Macauto Industrial Co., Ltd., Tainan (TW)

(72) Inventors: Paul Lin, Tainan (TW); Hung-Ming Yen, Tainan (TW)

(73) Assignee: Macauto Industrial Co., Ltd., Tainan (TW)

( * ) Notice: Subject to any disclaimer, the term of this patent is extended or adjusted under 35 U.S.C. 154(b) by 329 days.

(21) Appl. No.: 14/564,995

(22) Filed: Dec. 9, 2014

(65) Prior Publication Data
US 2015/0176330 A1 Jun. 25, 2015

(30) Foreign Application Priority Data
Dec. 25, 2013 (TW) .............................. 102224399 U (51) Int. Cl.
| | | |
|---|---|---|
| *E06B 9/60* | (2006.01) | |
| *B60J 3/02* | (2006.01) | |
| *E06B 9/40* | (2006.01) | |
| *B60J 1/20* | (2006.01) | |

(52) U.S. Cl.
CPC ............... *E06B 9/60* (2013.01); *B60J 1/2016* (2013.01); *B60J 1/2019* (2013.01); *B60J 3/0204* (2013.01); *E06B 9/40* (2013.01)

(58) Field of Classification Search
CPC .......... B60J 1/2033; B60J 3/0204; E06B 9/60
See application file for complete search history.

(56) References Cited

U.S. PATENT DOCUMENTS

| | | | | |
|---|---|---|---|---|
| 6,079,474 A | * | 6/2000 | Lin ........................ | B60J 1/205 160/262 |
| 2012/0267060 A1 | * | 10/2012 | Anderson ............... | E06B 9/262 160/241 |
| 2013/0008619 A1 | * | 1/2013 | Katada ................... | B60J 1/2055 160/309 |
| 2016/0010390 A1 | * | 1/2016 | Smith ...................... | E06B 9/60 160/302 |

* cited by examiner

*Primary Examiner* — Terence Boes
(74) *Attorney, Agent, or Firm* — C. G. Mersereau; Nikolai & Mersereau, P.A.

(57) ABSTRACT

A roll control device of a vehicle curtain is mounted on a receiving housing and is connected to a curtain rod for wrapping a curtain fabric. The roll control device has a cover, a gear set mounted in the cover, and a one-way transmission assembly and a damping member respectively mounted on a first gear and a second gear of the gear set. The damping member provides rotational resistance to the first gear. When expanding the curtain fabric, with the one-way transmission assembly, the curtain fabric can be easily drawn. When retracting the curtain fabric, with the torsional resistance, the curtain fabric can be smoothly and gently wrapped on the curtain rod without causing noise and excessive vibration.

9 Claims, 9 Drawing Sheets

FIG.8

ROLL CONTROL DEVICE OF A VEHICLE CURTAIN

BACKGROUND OF THE INVENTION

1. Field of the Invention

The present invention relates to a vehicle curtain, especially to a roll control device of a vehicle curtain.

2. Description of the Prior Art(s)

A conventional vehicle curtain comprises a hollow receiving housing, a curtain rod rotatably mounted in the receiving housing, a curtain fabric connected to the curtain rod, and a rolling device connected to an end of the curtain rod and having a torsion spring.

When the curtain fabric is drawn out of the receiving housing and expanded, the torsion spring of the rolling device is twisted and stores elastic potential energy. When the curtain fabric is retracting, the elastic potential energy of the torsion spring drives the curtain rod to roll backward to wrap the curtain fabric around the curtain rod. However, during retracting of the curtain fabric, once the curtain fabric is released and the curtain rod rolls freely to wrap the curtain fabric, the elastic potential energy is so large that the curtain rod vibrates excessively and causes noise.

To overcome the shortcomings, the present invention provides a roll control device of a vehicle curtain to mitigate or obviate the aforementioned problems.

SUMMARY OF THE INVENTION

The main objective of the present invention is to provide a roll control device of a vehicle curtain. The roll control device is mounted on an end of a receiving housing of the vehicle curtain and is connected to a curtain rod for wrapping a curtain fabric. The roll control device has a cover, a gear set, a one-way transmission assembly, and a damping member. The cover is securely mounted on the end of the receiving housing. The gear set is mounted in the cover and has a first gear and a second gear. The first gear and the second gear mesh with each other. The one-way transmission assembly is mounted on the second gear and has a transmission member and a torsion spring. The transmission member is connected to the curtain rod. The torsion spring is mounted around the transmission member and is connected to the second gear. The damping member is mounted on the first gear, is securely connected to the receiving housing, and provides torsional resistance to the first gear.

When expanding the curtain fabric, the transmission member spins in the torsion spring, so the curtain fabric can be easily drawn and expanded.

When retracting the curtain fabric, the transmission member drives the second gear via the torsion spring, and the damping member provides the torsional resistance to the one-way transmission assembly via the gear set, so the curtain fabric can be smoothly and gently wrapped on the curtain rod without causing noise and excessive vibration.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
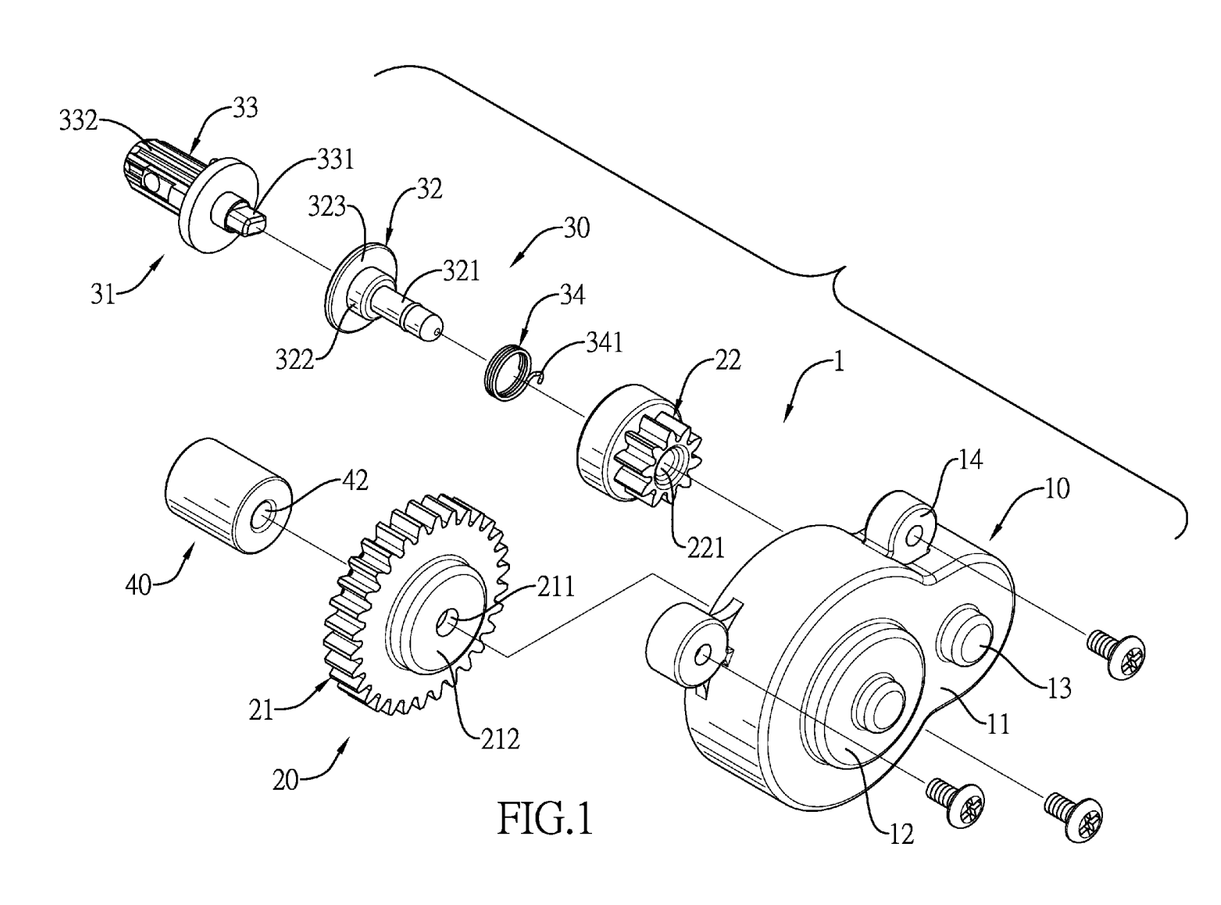
FIG. 1 is an exploded perspective view of a roll control device of a vehicle curtain in accordance with the present invention.
Figure 2:
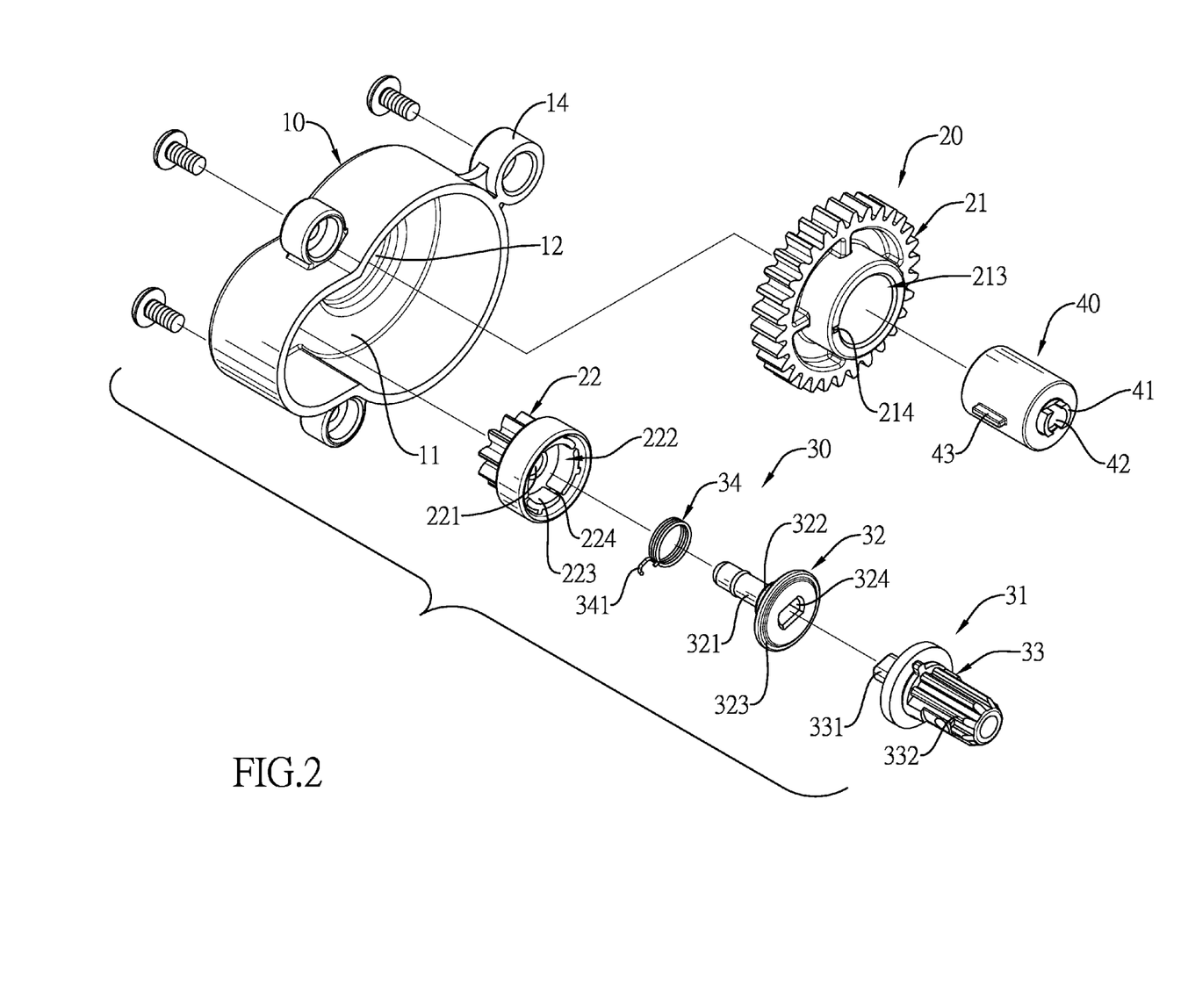
FIG. 2 is another exploded perspective view of the roll control device in FIG. 1.
Figure 3:
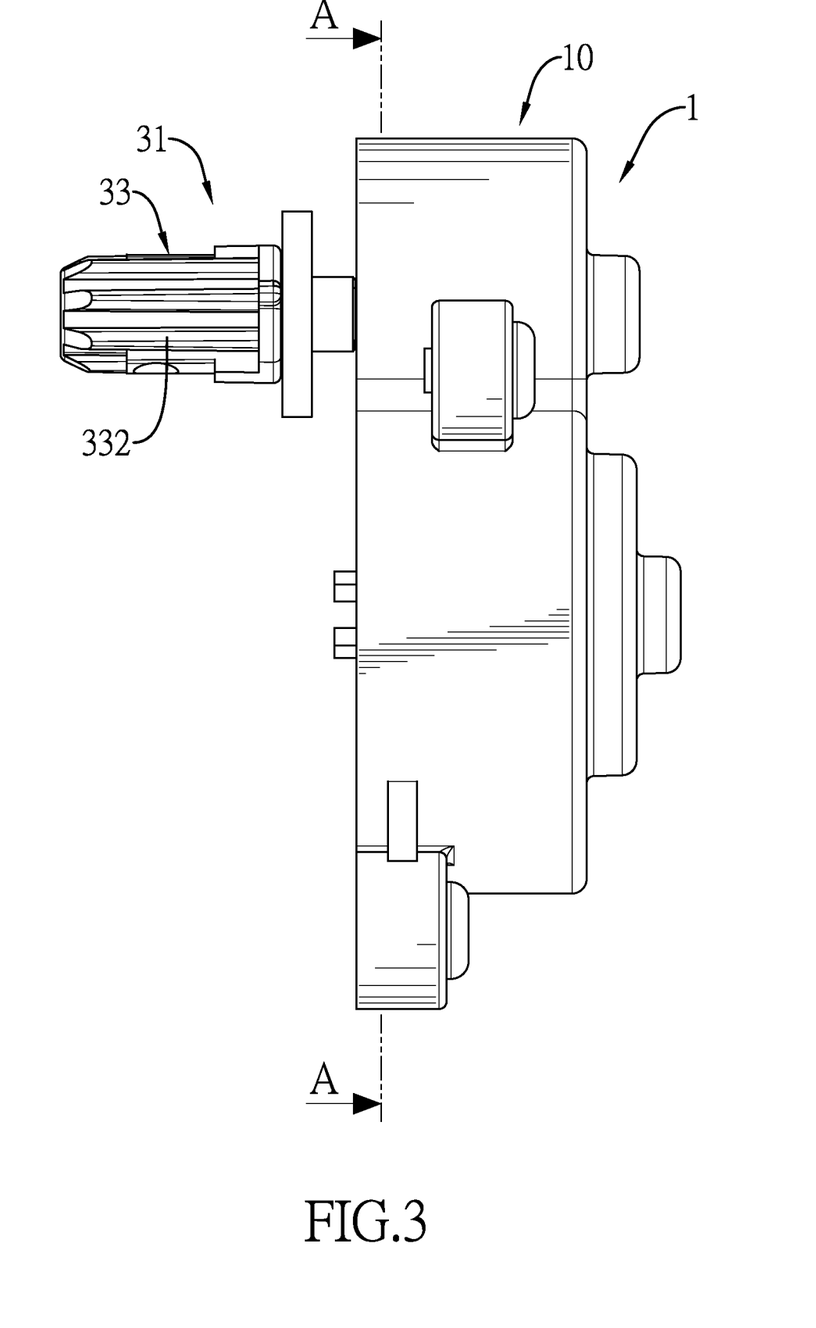
FIG. 3 is a side view of the roll control device in FIG. 1.

With reference to FIG. 1, a roll control device 1 of a vehicle curtain in accordance with the present invention comprises a cover 10, a gear set 20, a one-way transmission assembly 30, and a damping member 40.

With reference to FIGS. 1 to 6 and 6, the cover 10 is fastened to a first end of a receiving housing 2 via screws. The cover 10 has a mounting chamber, a side opening, a side panel 11, a first pivot portion 12, and a second pivot portion 13. The mounting chamber is formed inside the cover 10. The side opening communicates with the mounting chamber. The side panel 11 is opposite to the side opening. The first pivot portion 12 and the second pivot portion 13 are separately formed on the side panel 11. In the preferred embodiment, the cover 10 further has multiple fastening protrusions 14 separately formed on a periphery of the cover 10. Each of the fastening protrusions 14 has a fastening hole for the screws to be fastened in the fastening holes of the fastening protrusions 14.

With reference to FIGS. 1, 2, 4, and 5, the gear set 20 is mounted in the mounting chamber of the cover 10 and includes a first gear 21 and a second gear 22.

The first gear 21 is rotatably mounted in the mounting chamber of the cover 10 and has two opposite end surfaces, a first pivot hole 211, a first shaft portion 212, a first chamber 213, and an inner sidewall. The first pivot hole 211 is formed through the first gear 21 and axially extends between the end surfaces of the first gear 21. The first shaft portion 212 is formed on one of the end surfaces of the first gear 21 and is pivotally mounted to the first pivot portion 12 of the cover 10. The first chamber 213 is formed in the other end surface of the first gear 21 and communicates with the first pivot hole 211. The inner sidewall of the first gear 21 is defined around the first chamber 213.

The second gear 22 is rotatably mounted in the mounting chamber of the cover 10, meshes with the first gear 21, and has two opposite end surfaces, a second pivot hole 221, a second chamber 222, a connecting portion 223, and at least one positioning notch 224. The second pivot hole 221 is formed through the second gear 22 and axially extends between the end surfaces of the second gear 22. The second chamber 222 is formed in one of the end surfaces of the second gear 22 and communicates with the second pivot hole 221. The connecting portion 223 is disposed in the second chamber 222. The at least one positioning notch 224 is formed in the connecting portion 223. In the preferred embodiment, number of teeth of the first gear 21 is larger than number of teeth of the second gear 22.

With reference to FIGS. 1, 2, 4, and 5, the one-way transmission assembly 30 is mounted on the second gear 22 and has a transmission member 31 and a torsion spring 34.

The transmission member 31 may be integrally formed as a single part. Alternatively, the transmission member 31 may be formed by assembling multiple parts. The transmission member 31 has two opposite ends, a pivot portion 321, and a shaft portion 332. The pivot portion 321 is formed on one of the ends of the transmission member 31, is rotatably mounted through the second pivot hole 221 of the second gear 22, and protrudes to the second pivot portion 13 of the cover 10. The shaft portion 332 is formed on the other end of the transmission member 31.

The torsion spring 34 is mounted around the pivot portion 321 of the transmission member 31, is disposed in the second chamber 222 of the second gear 22, and has a connecting end 341 and a free end. The connecting end 341 of the torsion spring 34 is securely connected to the connecting portion 223 of the second gear 22. In the preferred embodiment, the connecting end 341 of the torsion spring 34 is inserted in one of the at least one positioning notch 224 in the connecting portion 223 of the second gear 22.

When the transmission member 31 is in a static state, the torsion spring 34 contacts an outer surface of the pivot portion 321 of the transmission member 31. When the transmission member 31 rotates forward, the transmission member 31 spins and does not drive the gear set 20. When the transmission member 31 rotates backward, the transmission member 31 drives the gear set 20.

With reference to FIGS. 1, 2, 4, and 5, in the preferred embodiment, the transmission member 31 includes a pivot element 32 and a shaft element 33.

The pivot element 32 has the pivot portion 321, a spring mount 322, an end panel 323, and a coupling hole 324. The pivot portion 321 is cylindrical. The spring mount 322 is formed on an end of the pivot portion 321 and is larger than the pivot portion 321 in diameter. The torsion spring 34 is spirally mounted around the spring mount 322 of the pivot element 32. The spring mount 322 has an outer end being opposite to the pivot portion 321. The end panel 323 is formed on the outer end of the spring mount 322 and is larger than the spring mount 322 in diameter. The coupling hole 324 is formed in the end panel 323 and is non-circular in cross-section. Specifically, the coupling hole 324 may be polygonal, such as rectangular, in cross-section.

The shaft element 33 has two opposite ends, a coupling portion 331, and the shaft portion 332. The coupling portion 331 is formed on one of the ends of the shaft element 33 and engages in the coupling hole 324 of the pivot element 32, such that the shaft element 33 and the pivot element 32 are connected with each other as a single member. The shaft portion 332 is formed on the other end of the shaft element 33.

With reference to FIGS. 1, 2, 4, and 5, the damping member 40 is mounted in the first chamber 213 of the first gear 21 and has a fixing protrusion 41, an outer sidewall, and a through hole 42. The fixing protrusion 41 protrudes out of the first gear 21 and is securely connected to a stationary object. The outer sidewall of the damping member 40 is attached to the inner sidewall of the first gear 21 for the damping member 40 to provide a torsional resistance to the first gear 21. The through hole 42 is axially formed through the damping member 40 and aligns with the first pivot hole 211 of the first gear 21.

In the preferred embodiment, the first gear 21 further has a positioning recess 214. The positioning recess 214 is formed in the inner sidewall of the first gear 21. The damping member 40 further has a positioning protrusion 43. The positioning protrusion 43 is formed on the outer sidewall of the damping member 40 and engages in the positioning recess 214 of the first gear 21. Thus, the damping member 40 and the first gear 21 can be connected with each other via the positioning protrusion 43 and the positioning recess 214.

Figure 5:
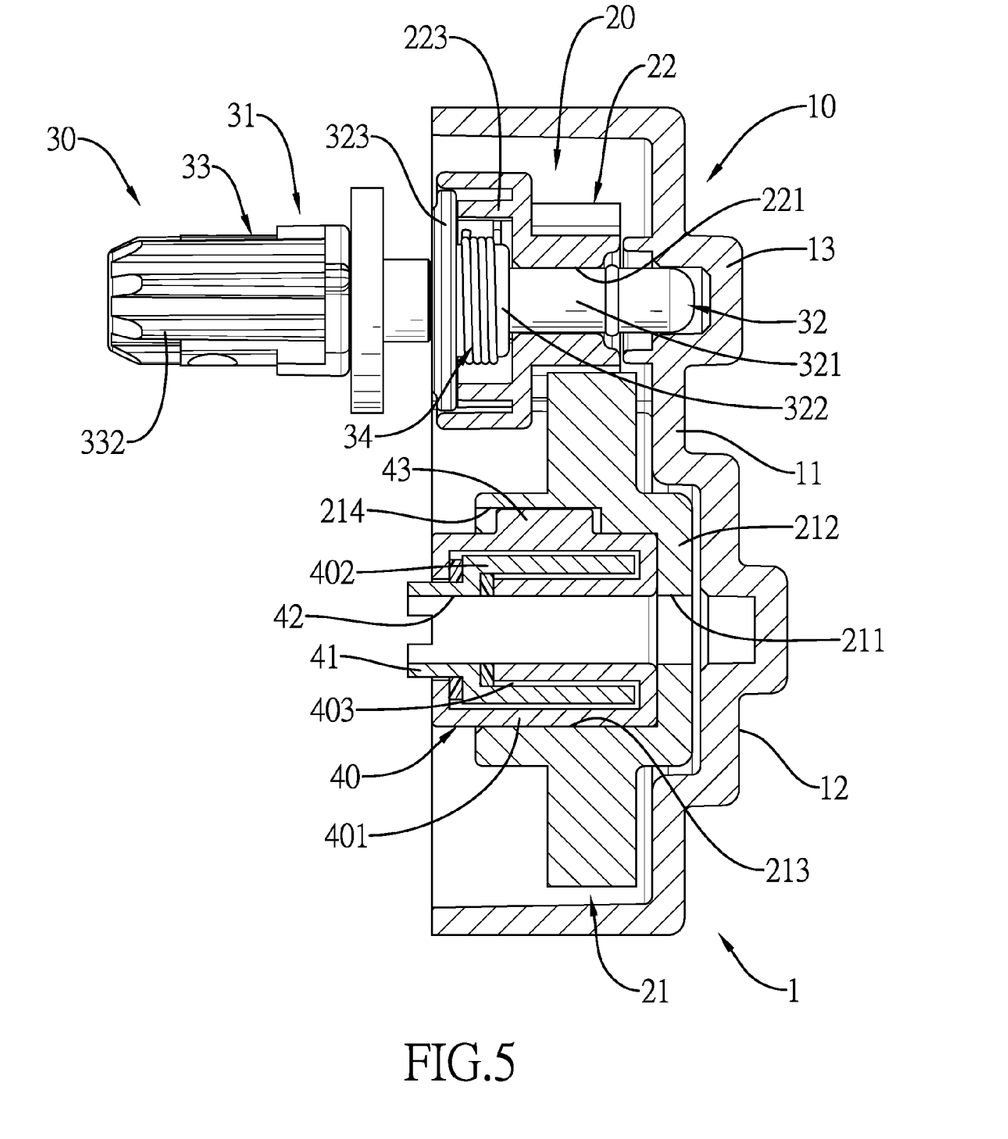
FIG. 5 is a side view in partial section of the roll control device in FIG. 1.

In the preferred embodiment, the damping member 40 is conventional. As shown in FIG. 5, the damping member 40 includes an outer element 401 and an inner element 402. The inner element 402 is rotatably mounted in the outer element 401. The fixing protrusion 41 is formed on an end of the inner element 402 and protrudes out of the outer element 401. Grease 403 with high viscosity is filled between the outer element 401 and the inner element 402 and is sealed by O-rings. The positioning protrusion 43 is formed on an outer sidewall of the outer element 401. As the outer element 401 and the inner element 402 rotate relative to each other, the grease 403 with high viscosity provides the torsional resistance.

With reference to FIGS. 6 to 9, when the roll control device 1 is used in the vehicle curtain, the roll control device 1 is mounted on the first end of the receiving housing 2. The shaft portion 332 of the transmission member 31 and a rolling device 3 that is mounted on a second end of the receiving housing 2 are respectively connected to two ends of a curtain rod 4 that is mounted in the receiving housing 2. The fixing protrusion 41 of the damping member 40 is securely connected to the first end of the receiving housing 2. The receiving housing 2 further has a pivot shaft 6. The pivot shaft 6 is disposed on the first end of the receiving housing 2, is mounted through the damping member 40 and the first gear 21, and is then connected to the first pivot portion 12 on the side panel 11 of the cover 10. The pivot shaft 6 may be integrally formed on the receiving housing 2. Alternatively, the pivot shaft 6 may be detachably mounted on the first end of the receiving housing 2. The cover 10 is fastened to the first end of the receiving housing 2 via the screws. A curtain fabric 5 is connected to and is wrapped around the curtain rod 4 that is mounted in the receiving housing 2. The curtain fabric 5 can be drawn out of the receiving housing 2 to become expanded. When the curtain fabric 5 is released, the rolling device 3 drives the curtain rod 4 to rotate, so as to wrap the curtain fabric 5 around the curtain rod 4 and to receive the curtain fabric 5 in the receiving housing 2.

Figure 4:
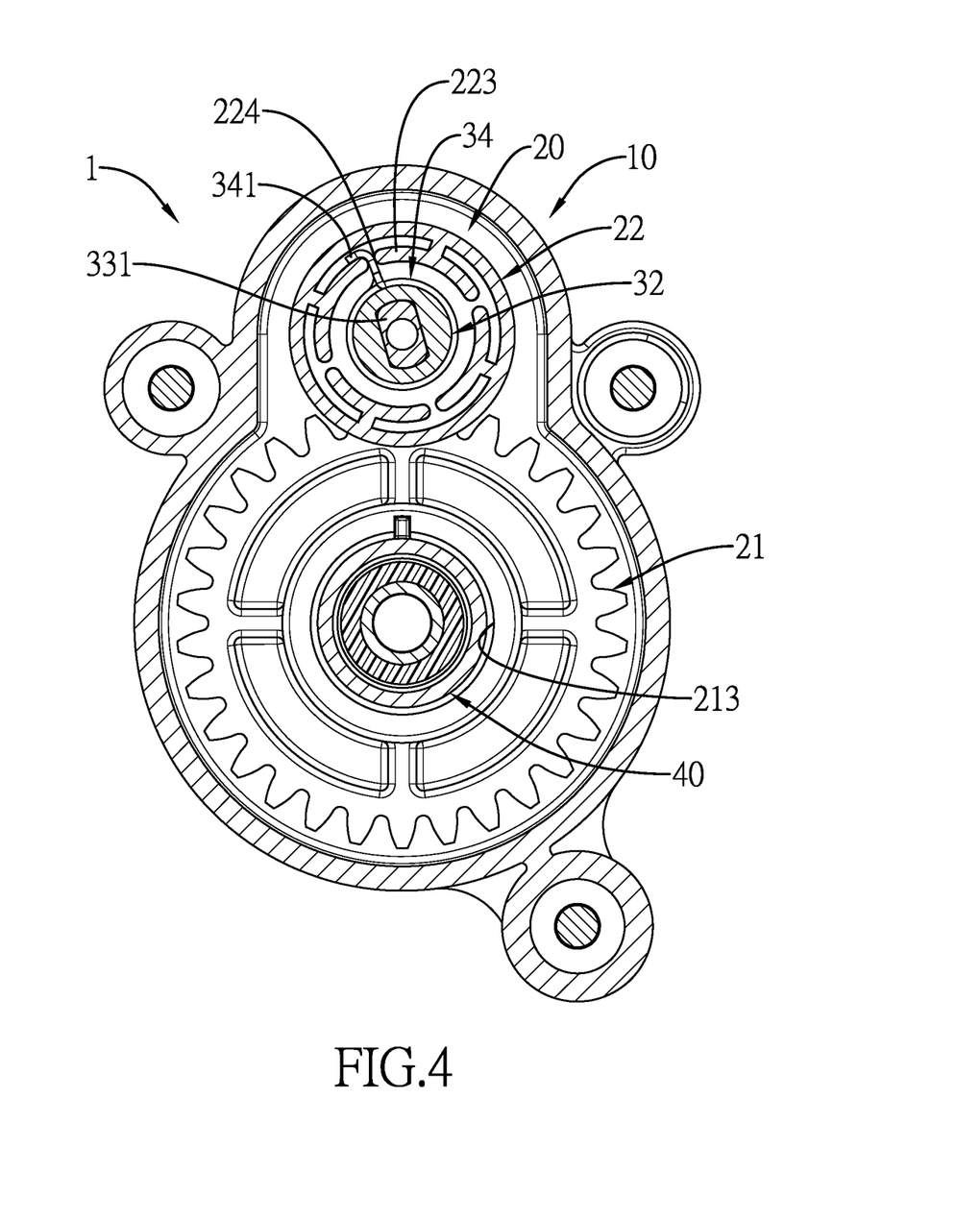
FIG. 4 is a cross-sectional end view of the roll control device along line A-A in FIG. 3.
Figure 6:
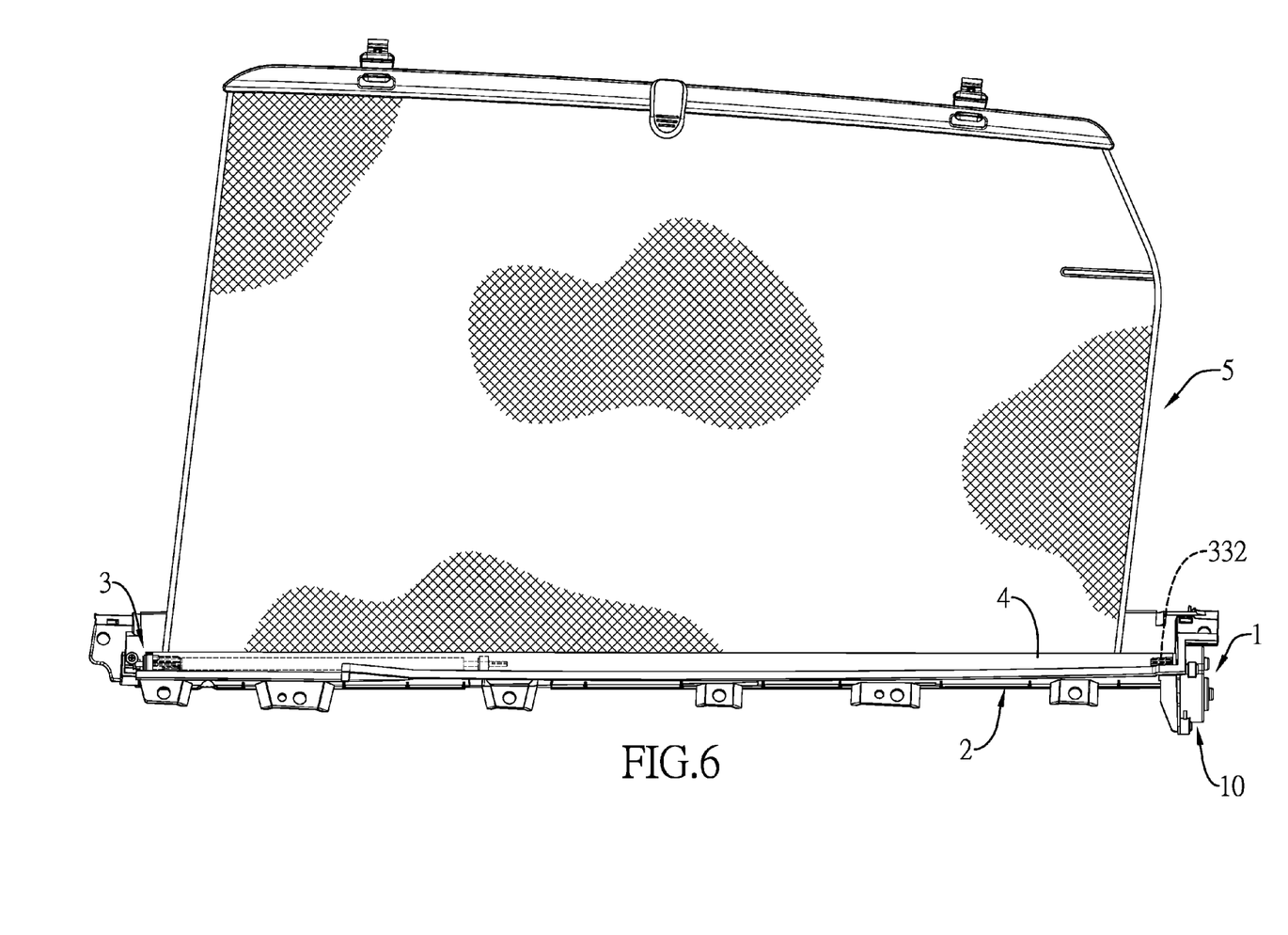
FIG. 6 is an operational side view of the roll control device in FIG. 1.
Figure 7:
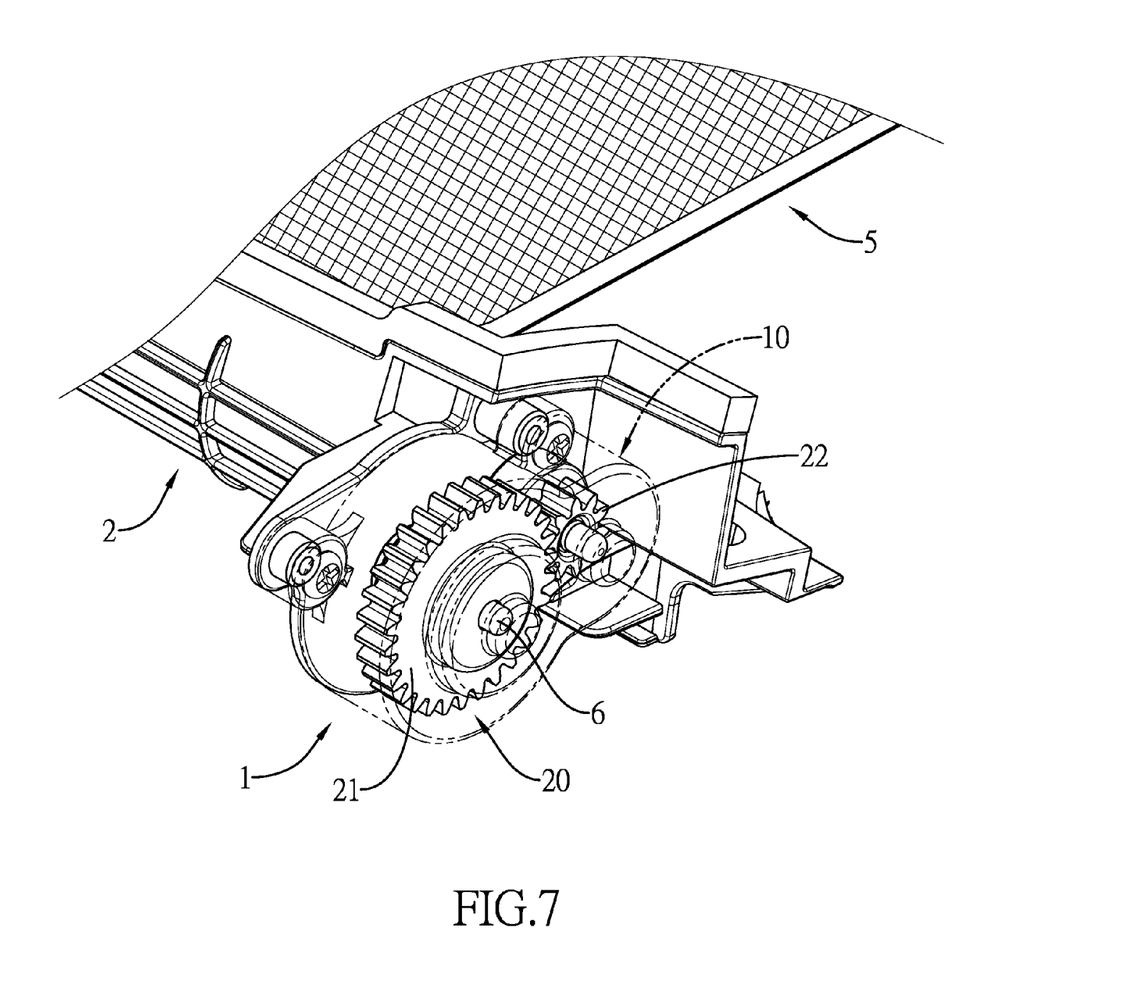
FIG. 7 is an enlarged operational perspective view of the roll control device in FIG. 1.
Figure 8:
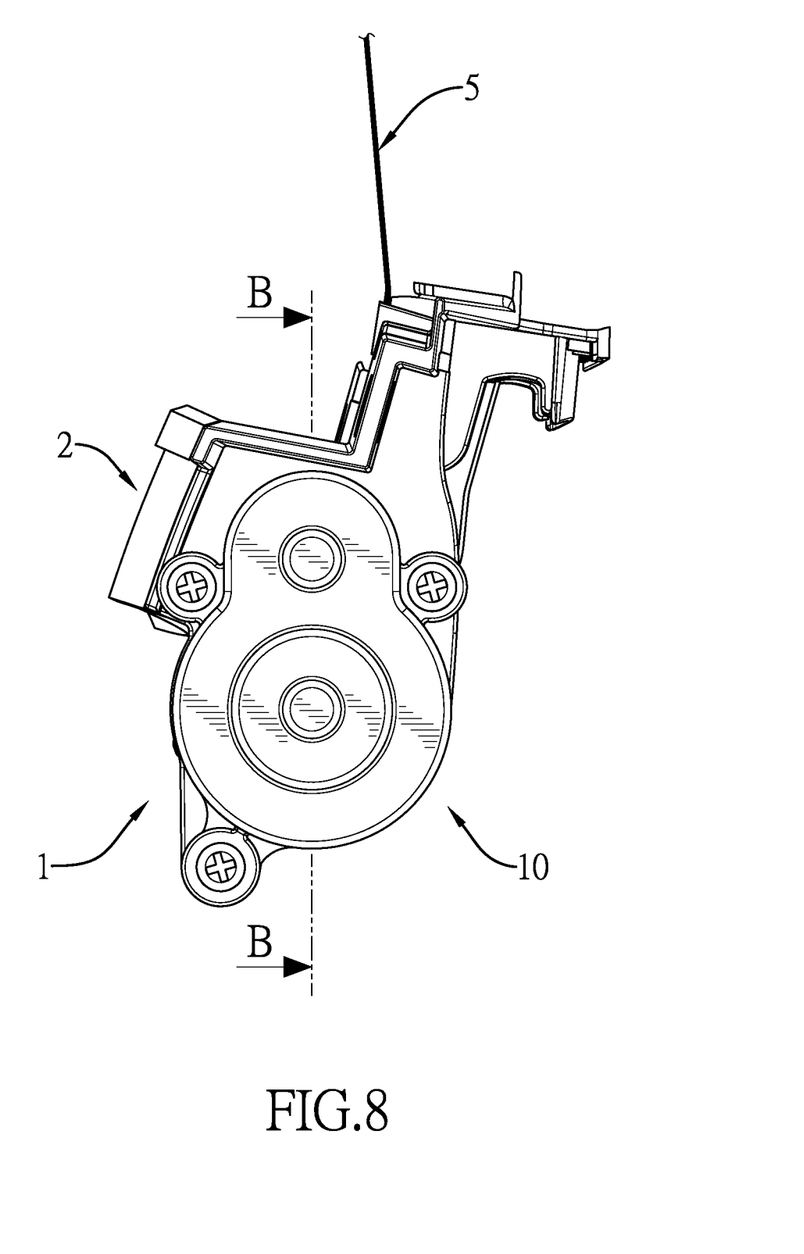
FIG. 8 is an enlarged operational end view of the roll control device in FIG. 1.
Figure 9:
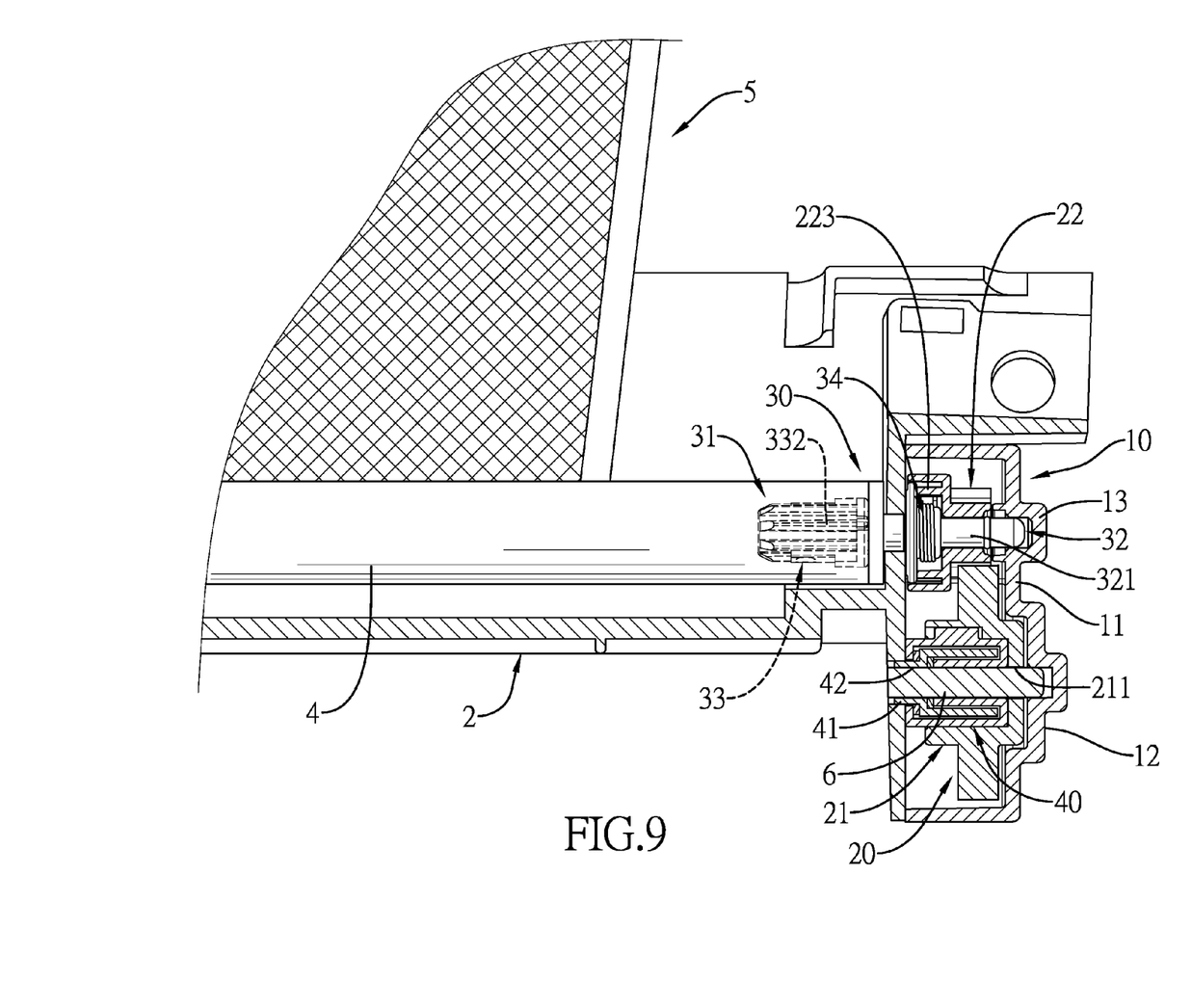
FIG. 9 is an enlarged operational side view in partial sectional of the roll control device along ling B-B in FIG. 8.

With reference to FIGS. 4, 6, and 9, when a user draws the curtain fabric 5 from the receiving housing 2 to expand the curtain fabric 5, the curtain rod 4 drives the transmission member 31 to rotate forward in a forward rotation direction and the rolling device 3 stores elastic potential energy.

Since the connecting end 341 of the torsion spring 34 is connected to the second gear 22, the free end of the torsion spring 34 is free from connecting with anything, and a helix of the torsion spring 34 is turned in a direction that is the same as the forward rotation direction of the curtain rod 4, the torsion spring 34 is loosened from the pivot portion 321 of the transmission member 31 and is free from driving the second gear 22. Accordingly, the transmission member 31 spins in the second gear 22 and the user can easily draw and expand the curtain fabric 5.

When retracting the curtain fabric 5, the rolling device 3 drives the curtain rod 4, connected to the curtain fabric 3, to rotate backward with the elastic potential energy. Accordingly, the transmission member 31 rotates backward as well, such that the torsion spring 34 in the second gear 22 tightly wraps around the pivot portion 321 of the transmission member 31. Thus, the second gear 22 is driven to rotate by the transmission member 31 via the torsion spring 34. Moreover, with the number of the teeth of the second gear 22 being smaller than the number of the teeth of the first gear 21, a rotation speed of the first gear 21 is slower than a rotation speed of the second gear 22. The second gear 22 meshes with the first gear 21 having the damping member 40 mounted therein and the damping member 40 provides the torsional resistance to the first gear 21. Thus, a rotation movement of the curtain rod 4 is indirectly resisted by the gear set 20 and the one-way transmission assembly 30, and the curtain fabric 5 can be smoothly and gently wrapped on the curtain rod 4. Accordingly, no noise and excessive vibration would occur when retracting the curtain fabric 5.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A roll control device of a vehicle curtain comprising:
   a cover having a mounting chamber;
   a gear set mounted in the mounting chamber of the cover and including
      a first gear rotatably mounted in the mounting chamber of the cover; and
      a second gear rotatably mounted in the mounting chamber of the cover and meshing with the first gear;
   a one-way transmission assembly mounted on the second gear and having
      a transmission member having
         a pivot portion formed on one of two opposite ends of the transmission member and rotatably mounted in the second gear; and
         a shaft portion formed on the other end of the transmission member; and
      a torsion spring mounted around the pivot portion of the transmission member and having
         a connecting end securely connected to the second gear; and
         a free end, and
   a damping member mounted in the first gear, providing torsional resistance to the first gear, and having a fixing protrusion, the fixing protrusion protruding out of the first gear;
   wherein the second gear is connected to the transmission member via the torsion spring; and
   the transmission member selectively rotates forward or backward to drive the torsion spring to selectively wrap tightly around the transmission member and drive the second gear, or to drive the torsion spring to be loosened from the transmission member and free from driving the second gear.

2. The roll control device as claimed in claim 1, wherein the second gear of the gear set has
   a second pivot hole formed through the second gear and axially extending between two opposite end surfaces of the second gear;
   a second chamber formed in one of the end surfaces of the second gear and communicating with the second pivot hole;
   a connecting portion disposed in the second chamber; and
   at least one positioning notch formed in the connecting portion;
the first gear of the gear set has
   a first pivot hole formed through the first gear and axially extending between two opposite end surfaces of the first gear;
   a first chamber formed in one of the end surfaces of the first gear and communicating with the first pivot hole, and
   an inner sidewall defined around the first chamber;
number of teeth of the first gear is larger than number of teeth of the second gear;
the connecting end of the torsion spring is inserted in one of the at least one positioning notch in the connecting portion of the second gear; and
the damping member further has an outer sidewall attached to the inner sidewall of the first gear.

3. The roll control device as claimed in claim 1, wherein the cover further has
   a side opening communicating with the mounting chamber of the cover;
   a side panel being opposite to the side opening; and
   a first pivot portion and a second pivot portion separately formed on the side panel;
the second gear of the gear set has
   a second pivot hole formed through the second gear and axially extending between two opposite end surfaces of the second gear;
   a second chamber formed in one of the end surfaces of the second gear and communicating with the second pivot hole;
   a connecting portion disposed in the second chamber; and
   at least one positioning notch formed in the connecting portion;
the first gear of the gear set has
   a first pivot hole formed through the first gear and axially extending between two opposite end surfaces of the first gear;
   a first shaft portion formed on one of the end surfaces of the first gear and pivotally mounted to the first pivot portion of the cover;
   a first chamber formed in the other end surface of the first gear and communicating with the first pivot hole; and
   an inner sidewall defined around the first chamber;
number of teeth of the first gear is larger than number of teeth of the second gear;
the connecting end of the torsion spring is inserted in one of the at least one positioning notch in the connecting portion of the second gear; and
the damping member further has an outer sidewall attached to the inner sidewall of the first gear.

4. The roll control device as claimed in claim 2, wherein the transmission member includes
   a pivot element having
      the pivot portion being cylindrical;
      a spring mount formed on an end of the pivot portion and being larger than the pivot portion in diameter, the spring mount having an outer end being opposite to the pivot portion;
      an end panel formed on the outer end of the spring mount and being larger than the spring mount in diameter; and
      a coupling hole formed in the end panel; and
   a shaft element having a coupling portion formed on one of two opposite ends of the shaft element and engaging in the coupling hole of the pivot element; and the shaft portion formed on the other end of the shaft element;

the torsion spring is spirally mounted around the spring mount of the pivot element.

5. The roll control device as claimed in claim 3, wherein the transmission member includes a pivot element having the pivot portion being cylindrical;

a spring mount formed on an end of the pivot portion and being larger than the pivot portion in diameter, the spring mount having an outer end being opposite to the pivot portion;

an end panel formed on the outer end of the spring mount and being larger than the spring mount in diameter; and a coupling hole formed in the end panel; and a shaft element having a coupling portion formed on one of two opposite ends of the shaft element and engaging in the coupling hole of the pivot element; and the shaft portion formed on the other end of the shaft element;

the torsion spring is spirally mounted around the spring mount of the pivot element.

6. The roll control device as claimed in claim 2, wherein the first gear further has a positioning recess formed in the inner sidewall of the first gear; and the damping member further has a positioning protrusion formed on the outer sidewall of the damping member and engaging in the positioning recess of the first gear;

a through hole axially formed through the damping member and aligning with the first pivot hole of the first gear.

7. The roll control device as claimed in claim 3, wherein the first gear further has a positioning recess formed in the inner sidewall of the first gear; and the damping member further has a positioning protrusion formed on the outer sidewall of the damping member and engaging in the positioning recess of the first gear;

a through hole axially formed through the damping member and aligning with the first pivot hole of the first gear.

8. The roll control device as claimed in claim 4, wherein the first gear further has a positioning recess formed in the inner sidewall of the first gear; and the damping member further has a positioning protrusion formed on the outer sidewall of the damping member and engaging in the positioning recess of the first gear;

a through hole axially formed through the damping member and aligning with the first pivot hole of the first gear.

9. The roll control device as claimed in claim 5, wherein the first gear further has a positioning recess formed in the inner sidewall of the first gear; and the damping member further has a positioning protrusion formed on the outer sidewall of the damping member and engaging in the positioning recess of the first gear;

a through hole axially formed through the damping member and aligning with the first pivot hole of the first gear.

* * * * *